United States Patent
Fliearman et al.

(10) Patent No.: US 11,760,196 B2
(45) Date of Patent: Sep. 19, 2023

(54) TANDEM WHEEL ASSEMBLY WITH WHEEL END ADJUSTMENT

(71) Applicant: Deere & Company, Moline, IL (US)

(72) Inventors: Steven R. Fliearman, Coffeyville, KS (US); Gordon E. Miller, Hampton, IL (US); Jackson Baca, Owasso, OK (US); Prashant Shinde, Pune (IN)

(73) Assignee: DEERE & COMPANY, Moline, IL (US)

( * ) Notice: Subject to any disclaimer, the term of this patent is extended or adjusted under 35 U.S.C. 154(b) by 58 days.

(21) Appl. No.: 17/186,516

(22) Filed: Feb. 26, 2021

(65) Prior Publication Data

US 2022/0016975 A1     Jan. 20, 2022

(30) Foreign Application Priority Data

Jul. 16, 2020   (IN) .............................. 202021030318

(51) Int. Cl.
  *B60K 17/36*    (2006.01)
  *B60K 17/342*   (2006.01)

(52) U.S. Cl.
  CPC ............ *B60K 17/36* (2013.01); *B60K 17/342* (2013.01)

(58) Field of Classification Search
  CPC .............................. B60K 17/342; B60K 17/36
  See application file for complete search history.

(56) References Cited

U.S. PATENT DOCUMENTS

| | | | |
|---|---|---|---|
| 2,374,196 A * | 4/1945 | Harbers | B60K 17/36 180/69.6 |
| 2,819,910 A | 1/1958 | Walter | |

(Continued)

FOREIGN PATENT DOCUMENTS

| | | |
|---|---|---|
| CN | 201192987 Y | 2/2009 |
| CN | 110217103 A | 9/2019 |

(Continued)

OTHER PUBLICATIONS

USPTO Non-Final Office Action issued in utility U.S. Appl. No. 17/075,144 dated Oct. 18, 2021.

(Continued)

*Primary Examiner* — Barry Gooden, Jr.
(74) *Attorney, Agent, or Firm* — KLINTWORTH & ROZENBLAT IP LLP

(57) ABSTRACT

A tandem wheel assembly for a work vehicle includes a tandem wheel housing having a center opening disposed about a pivot axis and first and second wheel end openings disposed about associated first and second wheel axes that are substantially parallel with the pivot axis. A center sprocket within the tandem wheel housing is rotatable about the pivot axis. First and second wheel end assemblies include first and second wheel end shafts, sprockets and housings. The first and second wheel end sprockets are mounted to the associated shafts and are aligned to engage the center sprocket with at least one chain which transfers rotation of the center sprocket about the pivot axis to rotate the first and second wheel end sprockets about the associated first and second wheel axes. The first and second wheel end housings support the first and second wheel end shafts for relative rotation about the associated first and second wheel axes. The first wheel end housing is adjustably mounted to the tandem wheel housing to vary a first distance between the pivot axis and the first wheel axis.

18 Claims, 10 Drawing Sheets

(56) References Cited

U.S. PATENT DOCUMENTS

| | | | |
|---|---|---|---|
| 3,166,142 A | 1/1965 | Frazier | |
| 3,198,551 A | 8/1965 | Garner | |
| 3,450,221 A | 6/1969 | Nelson | |
| 3,786,888 A | 1/1974 | Nelson | |
| 3,792,871 A | 2/1974 | Chalmers | |
| 3,976,154 A | 8/1976 | Clark et al. | |
| 4,064,956 A | 12/1977 | Wildey | |
| 4,237,994 A | 12/1980 | McColl | |
| 4,278,141 A * | 7/1981 | Oswald | E02F 9/085 180/6.48 |
| 4,407,381 A * | 10/1983 | Oswald | E02F 9/02 180/297 |
| 4,535,860 A | 8/1985 | Waggoner | |
| 4,560,018 A | 12/1985 | Satzler | |
| 4,646,880 A | 3/1987 | Logan | |
| 5,016,905 A | 5/1991 | Licari | |
| 5,337,849 A * | 8/1994 | Eavenson, Sr. | B60K 17/342 180/385 |
| 5,417,297 A | 5/1995 | Auer | |
| 6,036,611 A | 3/2000 | Bigo et al. | |
| 6,112,843 A | 9/2000 | Wilcox et al. | |
| 6,200,240 B1 * | 3/2001 | Oates | B60K 17/36 475/221 |
| 6,416,136 B1 | 7/2002 | Smith | |
| 7,124,853 B1 | 10/2006 | Kole, Jr. | |
| 7,229,094 B2 | 6/2007 | Miller et al. | |
| 7,296,642 B1 | 11/2007 | DeWald | |
| 7,832,509 B2 | 11/2010 | Thomson et al. | |
| 7,954,574 B2 | 6/2011 | Schoon | |
| 8,262,125 B2 | 9/2012 | Sergison et al. | |
| 8,733,489 B2 | 5/2014 | Heine et al. | |
| 9,242,556 B2 | 1/2016 | Ziech et al. | |
| 9,358,880 B2 | 6/2016 | Bindl | |
| 9,868,322 B1 | 1/2018 | Varela | |
| 10,106,010 B2 | 10/2018 | Fliearman | |
| 10,107,363 B2 | 10/2018 | Fliearman et al. | |
| 10,207,580 B2 | 2/2019 | Long et al. | |
| 10,434,836 B2 | 10/2019 | Fliearman | |
| 11,376,956 B2 * | 7/2022 | Fliearman | B60G 13/04 |
| 2005/0045390 A1 | 3/2005 | Lamela et al. | |
| 2005/0279563 A1 * | 12/2005 | Peterson | B62D 7/144 180/414 |
| 2006/0154776 A1 * | 7/2006 | Claussen | B60K 17/36 475/231 |
| 2008/0230284 A1 | 9/2008 | Schoon | |
| 2010/0012401 A1 * | 1/2010 | Thomson | B60K 17/36 180/24.11 |
| 2015/0165898 A1 * | 6/2015 | Bindl | B60K 17/36 180/248 |
| 2016/0178041 A1 | 6/2016 | Hagman | |
| 2016/0263987 A1 | 9/2016 | Brownell et al. | |
| 2017/0050517 A1 | 2/2017 | Higuchi | |
| 2017/0080752 A1 * | 3/2017 | Varela | F16H 48/10 |
| 2018/0065439 A1 | 3/2018 | Fliearman | |
| 2018/0065440 A1 | 3/2018 | Fliearman | |
| 2018/0312060 A1 * | 11/2018 | Varela | B60K 17/165 |
| 2019/0001772 A1 | 1/2019 | Dyna | |
| 2019/0331173 A1 | 10/2019 | Eschenburg et al. | |
| 2020/0400226 A1 * | 12/2020 | Shinde | F16H 57/0443 |
| 2021/0323616 A1 | 10/2021 | Fliearman et al. | |
| 2022/0111726 A1 | 4/2022 | Fliearman et al. | |
| 2022/0340005 A1 * | 10/2022 | Fliearman | B60K 17/36 |

FOREIGN PATENT DOCUMENTS

| | | |
|---|---|---|
| DE | 19681259 C2 | 6/2000 |
| DE | 19908958 A1 | 9/2000 |
| DE | 102021209187 A1 | 4/2022 |
| GB | 567097 A | 1/1945 |
| GB | 1576166 A | 10/1980 |
| WO | 2012123630 A1 | 9/2012 |
| WO | 2016170410 A1 | 10/2016 |

OTHER PUBLICATIONS

John Deere, 317 and 320 Skid Steers, Introduction and Customer Information, T198465A A.1, Manufactured 2004-2009.
John Deere, 317 and 320 Skid Steers PC9347 Parts List—50 Power Train, undated, admitted prior art.
John Deere, Drive Chains and Sprockets—ST119001, 317 and 320 Skid Steers PC9347—50 Power Train Parts List, undated, admitted prior art.
John Deere, Axle ST119002, 317 and 320 Skid Steers PC9347—50 Power Train Parts List, undated, admitted prior art.
John Deere, Image of Fixed Axle Drive, undated, admitted prior art.
European Extended Search Report for application No. 17184539 dated Jan. 10, 2018.
USPTO Ex Parte Quayle Action for U.S. Appl. No. 15/255,860 issued Apr. 5, 2018.
Tigercat, H-Series Skidders, 620H | 630H | 632H | 625H | 635H Brochure © 2001-2020.
Tigercat Bogie Skidder Image, undated admitted prior art.
NAF Bogie Axles for Your Heavy Duty Playgrounds Brochure, 2019.
German Search Report issued in application No. DE102021209187.3 dated Mar. 29, 2022 (17 pages).
German Search Report issued in application No. DE102021203728.3 dated Feb. 14, 2022 (06 pages).
German Search Report issued in application No. DE102021207440.5 dated Mar. 17, 2022 (08 pages).
German Search Report issued in application No. DE102022202294.7 dated Oct. 13, 2022 with translation (21 pages).
USPTO Non-Final Office Action issued in utility U.S. Appl. No. 17/068,159 dated Oct. 7, 2022.
USPTO Non-Final Office Action issued in Utility U.S. Appl. No. 17/236,126 dated Mar. 31, 2023.
USPTO Non-Final Office Action issued in U.S. Appl. No. 16/852,117 dated Apr. 20, 2023.
USPTO Final Office Action issued in U.S. Appl. No. 17/068,159 dated Apr. 27, 2023.
U.S. Appl. No. 17/075,144, filed Oct. 20, 2020.

* cited by examiner

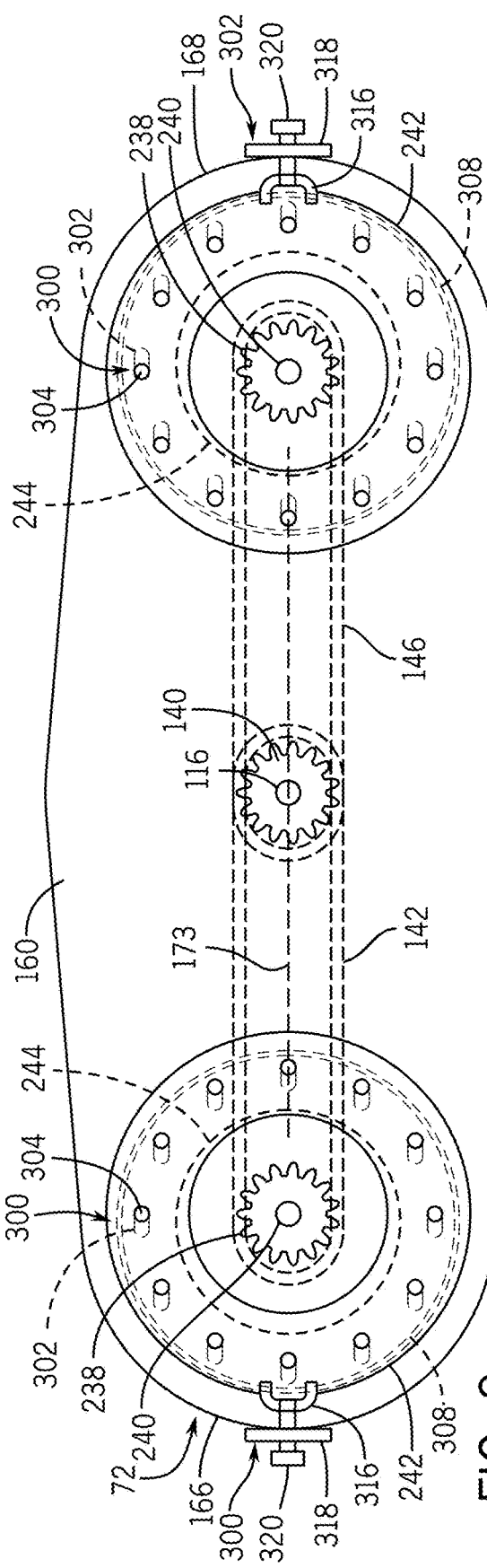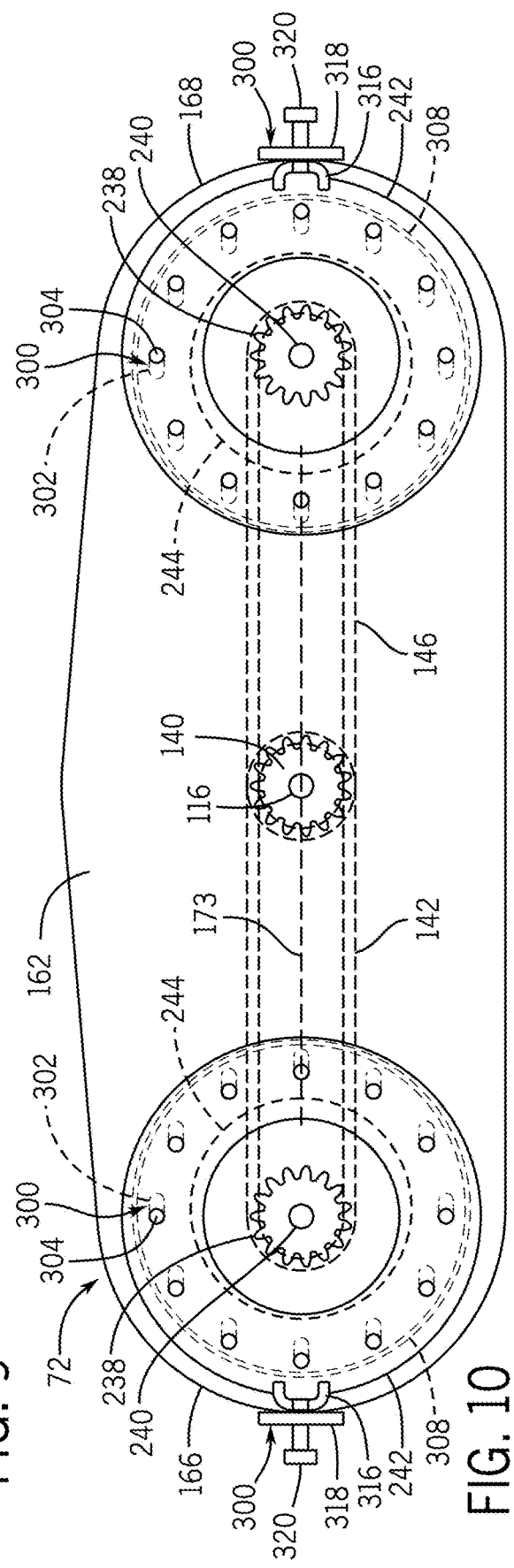

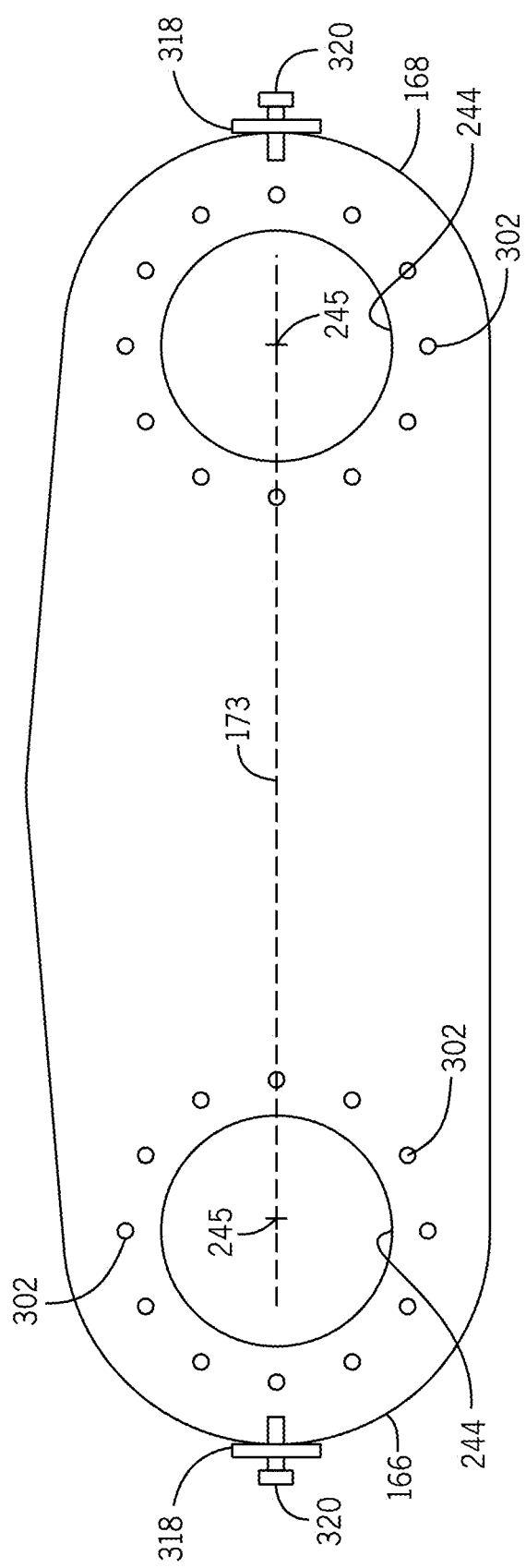
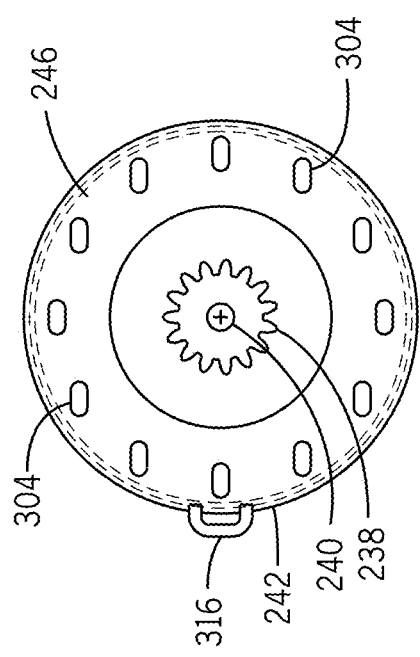
FIG. 11
FIG. 12

TANDEM WHEEL ASSEMBLY WITH WHEEL END ADJUSTMENT

CROSS-REFERENCE TO RELATED APPLICATION(S)

This application claims priority under 35 U.S.C. § 119(a) to India application Ser. No. 2020/21030318, filed Jul. 16, 2020.

STATEMENT OF FEDERALLY SPONSORED RESEARCH OR DEVELOPMENT

Not applicable.

FIELD OF THE DISCLOSURE

This disclosure generally relates to tandem wheel assemblies for work vehicles.

BACKGROUND OF THE DISCLOSURE

Work vehicles, such as used in the construction, agriculture, forestry, mining and other industries, may utilize tandem wheel assemblies (also known as bogie axles) to support significant loads across four or more ground-engaging or track wheels utilizing a single axle that allows the wheels pivot together to maintain ground contact over varying terrain without significantly shifting other areas of the work vehicle, including an operator cabin and a work implement (e.g., a blade). Such tandem wheel assemblies may also be driven (e.g., from the work vehicle powertrain through a transmission or may be powered themselves). One work vehicle that often utilizes a tandem wheel assembly is a motor grader. Applications may require the motor grader to deliver high-torque, low-speed power to the ground-engaging wheels or tracks, which is achieved through a high-ratio gear reduction to the wheels. Different applications may be suitable for different motor graders with different load-carrying capabilities. The various machines may have different overall dimensions and use different size wheels and tandem wheel assemblies of different sizes and wheelbases.

SUMMARY OF THE DISCLOSURE

The disclosure provides a tandem wheel assembly for a work vehicle in which the fore-aft spacing from the pivot axis of one or more of the wheel ends may be adjusted.

In one aspect, the disclosure provides a tandem wheel assembly for a work vehicle. A tandem wheel housing has a center opening disposed about a pivot axis and first and second wheel end openings disposed about associated first and second wheel axes that are substantially parallel with the pivot axis. A center sprocket within the tandem wheel housing is rotatable about the pivot axis. First and second wheel end assemblies include first and second wheel end shafts, sprockets and housings. The first and second wheel end shafts extend through the associated first and second wheel end openings of the tandem wheel housing. The first and second wheel end sprockets are mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes. The first and second wheel end housings support the first and second wheel end shafts for relative rotation about the associated first and second wheel axes. The first wheel end housing is adjustably mounted to the tandem wheel housing to vary a first distance between the pivot axis and the first wheel axis.

In another aspect, the disclosure provides a tandem wheel assembly for a work vehicle. A tandem wheel housing has a center opening disposed about a pivot axis and first and second wheel end openings disposed about associated first and second wheel axes that are substantially parallel with the pivot axis. A center sprocket within the tandem wheel housing is rotatable about the pivot axis. First and second wheel end assemblies include first and second wheel end shafts, sprockets and housings. The first and second wheel end shafts extend through the associated first and second wheel end openings of the tandem wheel housing. The first and second wheel end sprockets are mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes. The first and second wheel end housings support the first and second wheel end shafts for relative rotation about the associated first and second wheel axes. One or more of the first and second wheel end housings is adjustably mounted to the tandem wheel housing to vary one or more of first and second distances between the pivot axis and the associated first and second wheel axis.

The details of one or more embodiments are set forth in the accompanying drawings and the description below. Other features and advantages will become apparent from the description, the drawings, and the claims.

BRIEF DESCRIPTION OF THE DRAWINGS

FIG. 9 is a side elevational view showing example wheel end housings in a first position;

FIG. 10 is a side elevational view showing the example wheel end housings in a second position;

FIG. 11 is a side elevational view of another example tandem wheel housing of the tandem wheel assembly;

FIG. 12 is a side elevational view of another example wheel end housing; and

Like reference symbols in the various drawings indicate like elements.

DETAILED DESCRIPTION

Figure 1:
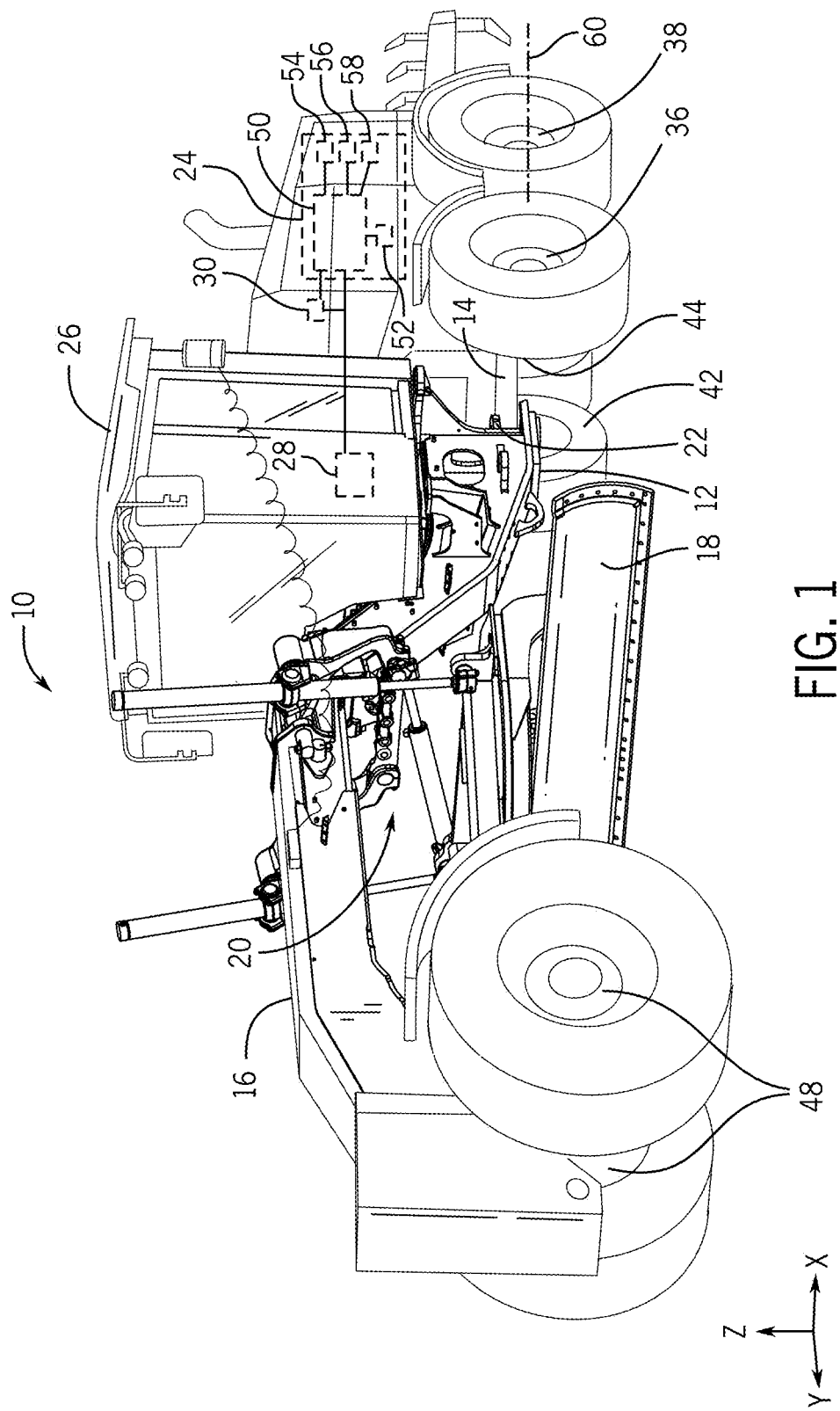
FIG. 1 is a simplified perspective view of an example work vehicle in the form of a motor grader in which a tandem wheel assembly may be used in accordance with this disclosure.
Figure 2:
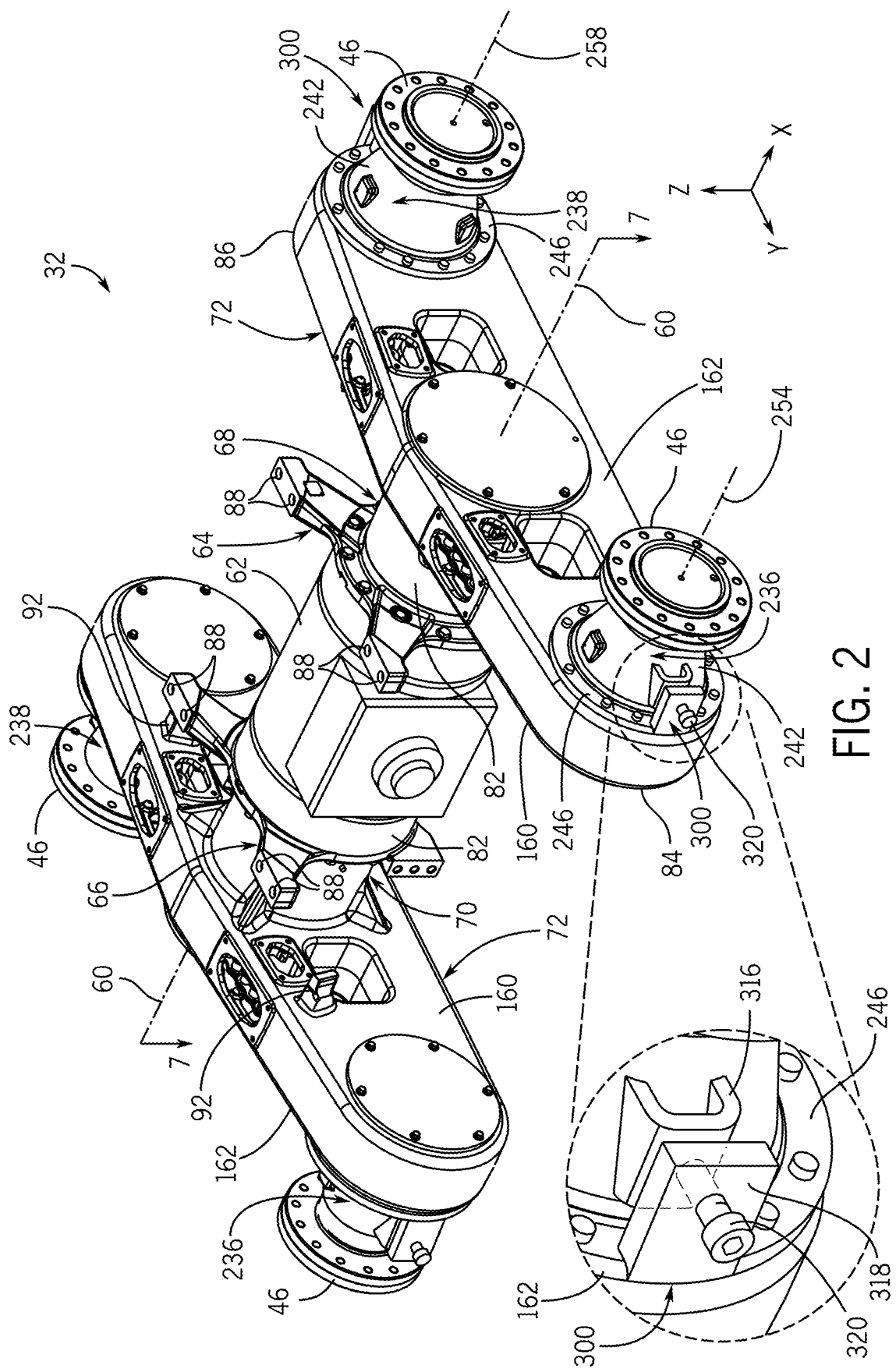
FIG. 2 is an isometric view of an example tandem wheel assembly for the example motor grader.

The following describes one or more example embodiments of the disclosed tandem wheel assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a wheel axle, pivot axis, and/or a work vehicle. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. In other examples, the components referenced by those terms may be reversed in accordance with the present disclosure.

Overview

Work vehicles, such as motor graders, typically include components such as a chassis, power train (e.g., engine and drivetrain), suspension, and work implements (e.g., blades) that implement tasks over a variety of terrain and conditions. Typically, the work vehicle may perform tasks that require consistent work implement positioning (e.g., blade scraping a work area at a desired height to produce a flat surface). The wheel axle region may support significant static weight loads from on-board components (e.g., engine, transmission, axle, work implements, etc.) and encounter significant operating loads (e.g., via attached work implements and shocks/loads through the wheels and suspension). Therefore, the work vehicle must accommodate varying terrain, static loads, and operating loads resulting from the work tasks while maintaining the desired implement positioning. A tandem wheel assembly may accommodate such loads or changes in grade by mounting wheel assemblies, typically rear wheel assemblies, together to pivot relative to the work vehicle, providing ground contact for the wheel without significantly hindering work implement placement.

In the case of a motor grader, the work implement is typically a large blade, which, during initial stages of site preparation, cuts and moves large quantities of ground. During final stages, the final base surface must be flat and precisely sloped over a large area and/or distance (e.g., several miles of roadway) even after rear wheels follow behind the blade. The motor grader must travel at sufficient speed to be productive while preventing unwanted bouncing and rocking; for example, a motor grader may work at a speed range from a slow "crawl" (e.g., 0.3-7 miles per hour (mph)) to higher speed ranges (e.g., 40 mph or more during transport and other operating states). During use, the blade experiences resistive forces such as friction from the ground, weight of previously-loosened soil and debris material while it flows along the blade, and shock loads from obstacles. The large blade size of modern motor graders carry significant volumes of ground or other material. The corresponding operating loads are transferred to through the chassis and drivetrain to the vehicle wheels, which transfer the load to the surface being prepared. Accordingly, the drivetrain and wheels can contribute to site preparation performance by maintaining ground contact for consistent traction while also evenly distributing loads on the ground surface to minimize pressure on the scraped work surface.

This disclosure provides a tandem wheel assembly having a tandem wheel housing that allows for different components to be provided therein to provide for a variety of lengths of wheelbases of the work vehicle. Only a single tandem wheel housing needs to be manufactured to accommodate the differing lengths of wheelbases. Work vehicle manufacturers may offer a line of a vehicle platform in different models or classes with multiple similar work vehicles varying in certain respects, such as chassis size, engine size, or various other features. For example, motor graders may be provided as different models with different blade sizes and different expected operating loads, which may require different wheel sizes, engine sizes, wheelbases, and the like. In some examples, related models may have tandem wheelbases that vary by about 60-160 mm (e.g., wheelbases of 1480 mm, 1540 mm, and 1640 mm). However, these different models also have many shared characteristics and components (e.g., drive train components, engine size, etc.). The tandem wheel assembly for different models of work vehicles may have variations (e.g., chain size and/or length, sprocket size and number of teeth) that require significant redesign and separate components across the platform line. Such tandem wheel assemblies may have complicated multi-part tandem wheel housings with several major components resized for each different model size. This disclosure provides a single tandem wheel housing that allows for various fore-aft adjustments of the wheel end assemblies and thereby wheelbase of the tandem wheel assembly.

In certain embodiments, the tandem wheel assembly has adjustment features that allow the wheel end assemblies of the tandem wheel assembly to move (e.g., slide or translate) generally in the fore-aft or travel direction of the work vehicle for initial installation in the factory or for in-field adjustment afterward. The adjustment features may include one or more adjustment openings for connecting the wheel end assemblies to the tandem wheel housing of the tandem wheel assembly. Such adjustment openings may include a plurality of holes or slots in either or both of the wheel end assemblies (e.g., at mounting flanges thereof) and the outer wall of the tandem wheel housing. The slots may be oriented with their long dimensions generally aligned with the fore-aft or travel direction of the work vehicle so that the wheel end assemblies may be positioned in various fore-aft locations relative to the tandem wheel housing. Once positioned, bolts or other threaded or unthreaded pin-type structures may be received in the slots to clamp the wheel end assemblies to the tandem wheel housing, and thereby removably fix the relative positions of the wheel end assemblies. As noted, the slots may be formed in both mating components (i.e., the wheel end assemblies and the tandem wheel housing) to extend the fore-aft adjustment distance. Instead of, or in addition to slots, multiple redundant openings (i.e., circular holes) that are spaced apart in the fore-aft direction may be included in either or both mating component to provide the adjustable mounting of the wheel end assemblies. While it may be advantageous to provide adjustability of both wheel end assemblies, this disclosure contemplates also that only one of the wheel end assemblies in the tandem wheel assembly (e.g., the forward or the rearward wheel end assembly) may be adjustable while the other may be in a fixed relative position.

Further, the adjustment features of the tandem wheel assembly disclosed herein may include one or more tensioning mechanisms for applying mechanical advantage to move the wheel end assemblies relative to the tandem wheel housing. In some embodiments, such tensioning mechanisms may be in the form of jack screw tensioners mounted operationally between the tandem wheel housing and one or both of the wheel end assemblies. For example, the tensioning mechanism may include a bracket fixed to the tandem wheel housing and a bracket fixed to each (or an associated one) wheel end assemblies. The brackets may include openings for bolts or other pin structures that couple the brackets together and permit the fore-aft spacing between the brackets to be adjusted. One or both openings in the brackets may be threaded and a bolt may engage the threaded openings such that rotation of the bolt in either clock direction causes the brackets to move relatively closer or farther apart. In one example, the bracket or brackets on the tandem wheel housing are fixed in position, and the wheel end assemblies are moved forward or rearward by the tensioning mechanism. Alternate tensioning mechanisms may be provided with unthreaded openings in the brackets and separate threaded nuts used to threadably engage the bolts. Still in other cases, the brackets may not be needed, and integral features of the tandem wheel housing and the wheel end assemblies may define openings or threaded openings which interface with a pin connector (e.g., a bolt). Other tensioning mechanisms are envisioned, including variation linkages, that may be actuated manually or under power (e.g., electrically or hydraulically motorized).

In certain embodiments, working elements of the tandem wheel assembly are partially or entirely engulfed in lubricating and cooling oil. The tandem wheel assembly of this disclosure is operable in such "wet" environments by employing a sliding face seal between the tandem wheel housing and the wheel end assemblies. The face seals may be O-rings or other gaskets that extend about openings in the tandem wheel housing for the wheel ends. The face seals also extend about the adjustment openings (e.g., slots and/or holes) so as to contain oil passing between the tandem wheel housing/wheel end interfaces. The face seals may be captured in corresponding recesses or grooves in either the tandem wheel housing or the wheel end assemblies. When adjusting the wheel end assemblies, the face seal moves with their host component and sealingly slides against the facial surface of the mating component, for example, the outer wall of the tandem wheel housing if the face seals mount to the wheel end assemblies, or inboard surfaces of mounting flanges of the wheel end assemblies if the face seals mount to the tandem wheel housing. In such "wet" applications, the adjustment features may be limited to slots or openings that are located within the area circumscribed by the face seal(s) and otherwise occluded by corresponding structure (e.g., surfaces of mating structures, mechanical fasteners and the like). This limitation does not apply to "dry" applications, such that the slots and redundant openings allowing for adjustment may be unsealed.

The following describes one or more example implementations of the disclosed tandem wheel housing. While discussion herein may sometimes focus on the example application of a tandem wheel assembly of a motor grader, the disclosed tandem wheel assembly may also be applicable to bogie axles or tandem axles in other types of work vehicles, including self-propelled or towed work vehicles, as well as various other agricultural machines (e.g., articulated tractors, utility tractors, front end loaders, harvesters and the like), various construction and forestry machines (e.g., forwarders, skidders and so on), and transportation vehicles (e.g., semi-trailers).

Example Embodiments of the Tandem Wheel Assembly

Referring to FIG. 1, in some embodiments, the disclosed work vehicle 10 may be a motor grader, although, as noted, the tandem wheel described herein may be applicable to a variety of machines, such as other construction vehicles, agricultural vehicles including articulated-frame tractors, forestry vehicles (e.g., forwarder), and transportation vehicles such as semi-trailers. As shown, the work vehicle 10 may be considered to include a chassis 12 constituted by a rear frame 14 and a front frame 16 for carrying a blade 18 that is selectively positioned by an implement drive system 20. The work vehicle 10 may further be considered to include a power train 24, an operator cabin 26, a control system 28, and a hydraulic system 30. In the illustrated example, the work vehicle 10 includes a tandem wheel assembly 32 on the rear frame 14 for mounting two wheels 36, 38 on a left side of the work vehicle 10 and for mounting two wheels 42, 44 on a right side of the work vehicle 10. Each wheel 36, 38, 42, 44 is mounted on tandem wheel assembly 32 by its wheel hub 46. The wheels 36, 38, 42, 44 include a pair of left wheels defined by a first left wheel 36 and a second left wheel 38, and a pair of right wheels defined by a first right wheel 42 and a second right wheel 44 (also collectively referred to as "the four tandem wheels 36, 38, 42, 44"). A front axle (not shown) on the front frame 16 mounts a third set of wheels 48 that may be configured to be steerable automatically or by operator control. It should be noted that any left/right wheel pairs may be arranged as dual wheels on each left/right lateral side of the work vehicle 10 (e.g., sides in the x-direction illustrated in FIG. 1).

Generally, the power train 24 includes a source of propulsion, such as an engine 50, which supplies power to the work vehicle 10, as either direct mechanical power or after being converted to electric power (e.g., via batteries) or hydraulic power. In one example, the engine 50 is an internal combustion engine, such as a diesel engine, that is controlled by an engine control module (not shown) of the control system 28. It should be noted that the use of an internal combustion engine is merely an example, as the source of propulsion may be a fuel cell, an electric motor, a hybrid-gas electric motor, or other power-producing devices. A transmission 52 transmits power from the engine 50 to one or more of the wheels 36, 38, 42, 44 of the tandem wheel assembly 32. Additionally, the power train 24 has wheel steering components 54, including various devices (e.g., power steering pumps and lines, steering mechanisms, and the like) that couple manual (e.g., operator steering controls or wheel) and/or automated (via the control system 28) steering input to one or more of the sets of wheels, such as the third set of wheels 48.

In addition to providing tractive power to propel the work vehicle 10, the engine 50 may provide power to various onboard subsystems, including various electrical and hydraulic components of the work vehicle, and for off-boarding power to other sub-systems remote from the work vehicle 10. For example, the engine 50 may provide mechanical power that is converted to an electric format to run the electronics of the control system 28 and one or more electric drives of the work vehicle 10. The power train 24 thus may have mechanical to electrical power conversion components 56, one or more batteries 58, and associated electronics, including various alternators, generators, voltage regulators, rectifiers, inverters, and the like. The engine 50 may also provide mechanical power that is converted to hydraulic format to power various pumps and compressors that pressurize fluid to drive various actuators of the hydraulic system 30 in order to power wheel steering and braking and various work implements onboard the work vehicle 10. The hydraulic system 30 may include other components (e.g., valves, flow lines, pistons/cylinders, seals/gaskets, and so on), such that control of various devices may be affected with, and based upon, hydraulic, mechanical, or other signals and movements.

The control system 28 may be configured as a computing device with associated processor devices and memory architectures, as a hard-wired computing circuit (or circuits), as a programmable circuit, as a hydraulic, electrical, or electro-hydraulic controller. The control system 28 may be configured to execute various computational and control functionality with respect to the work vehicle 10, including various devices associated with the power train 24, the hydraulic system 30, the implement drive system 20, and various additional components of the work vehicle 10. In some embodiments, the control system 28 may be configured to receive input signals in various formats (e.g., as hydraulic signals, voltage signals, current signals, and so on), and to output command signals in various formats (e.g., as hydraulic signals, voltage signals, current signals, mechanical movements, and so on).

As noted above, the hydraulic system 30 may be controlled by the control system 28 (automatically, via operator input, or both). The hydraulic system 30 may be powered by the engine 50 and configured in various arrangements to serve a plurality of hydraulic functions (e.g., powering the implement drive system 20). Accordingly, the hydraulic system 30 may have components (not shown) including a pump for supplying pressurized hydraulic fluid, a reservoir for storing hydraulic fluid, and various valves (e.g., a control valve) associated with each function.

In the illustrated example, when the work vehicle 10 drives in the forward direction (indicated in FIG. 1), the tandem wheel assembly 32 follows behind the blade 18 and supports most weight on the rear frame 14. The tandem wheel assembly 32 is pivotable about a pivot axis 60. In particular, each of the pair of the left wheels 36, 38 and the pair of right wheels 42, 44 can independently pivot relative to the work vehicle 10 about the pivot axis 60. During use, if the work vehicle 10 encounters an obstacle or an uneven surface, the tandem wheel assembly 32 accommodates this by pivoting. As a result, the transfer of bumps or terrain changes is mitigated or eliminated, maintaining the blade 18 and the cabin 26 in a relatively stable position that maintains traction and weight distribution. Likewise, the four tandem wheels 36, 38, 42, 44 maintain ground contact while pivoting.

The tandem wheel assembly 32 mounts the four tandem wheels 36, 38, 42, 44 below the rear frame 14. The example tandem wheel assembly 32 may include a differential housing 62, first mounting arms 64, second mounting arms 66, a first pivot joint 68, a second pivot joint 70, and first and second tandem wheel housings 72. The tandem wheel assembly 32 also functions to allow pivoting of the four tandem wheels 36, 38, 42, 44 relative to the work vehicle 10 about the pivot axis 60. The differential housing 62 is rigidly affixed to the first and second mounting arms 64, 66, which are fixed to the chassis 12 of the work vehicle 10 (e.g., via bolts through arm bores 88). Thus, the differential housing 62 is relatively fixed in place and one or both of the first and second tandem wheel housings 72 pivot independently relative to the differential housing 62 via the first and second pivot joints 68, 70. It will be appreciated tandem wheel assembly 32 provides a robust and elegant design.

As also noted above, the tandem wheel assembly 32 includes components of the power train 24 to transmit motive power to each of the four wheels 36, 38, 42, 44. A differential 100 is mounted in the differential housing 62 and connected to a driveshaft 102 that is driven by the transmission 52. The differential 100 includes gearing components to split and translate rotation of the driveshaft 102 laterally outboard toward the first and second tandem wheel housings 72. A pinion gear 104 at the end of the driveshaft 102 meshes with a differential ring gear 106 mounted with a differential case 108 that is coupled to a first inboard shaft 110 and a second inboard shaft 112 (via a side gear 114). The differential 100 may be a limited-slip differential with a clutch pack 115 for resisting slip. The first inboard shaft 110 is coupled to a first outboard shaft 116 after gear reduction provided by a planetary gear set 118. Likewise, the second inboard shaft 112 is coupled to a second outboard shaft 117 after gear reduction provided by a planetary gear set 118, 119. In particular, the planetary gear set 118 (likewise for planetary gear set 119) includes a sun gear 120 formed on (or mounted on) the first inboard shaft 110, a plurality of planet gears 122 within a fixed ring gear 124, and a carrier 126 rotating with the plurality of planet gears 122. Each carrier 126 is non-rotationally affixed to the outboard shafts 116, 117 which respectively extend into the first and second tandem wheel housings 72. Each planetary gear set 118, 119 is selectively activated by a clutch pack 128.

The components of the power train 24 in the tandem wheel assembly 32 may include additional support components such as bearings for any rotating components. For example, the driveshaft 102 is supported in the differential housing 62 by first and second bearings 130a, 130b, which may be tapered roller bearings mounted in opposing tapered directions to accommodate axial loads in addition to rotation. The first inboard shaft 110 may be supported by one or more rotational bearings, as illustrated a tapered roller bearing 132 supports the first inboard shaft 110 between the differential 100 and the planetary gear set 118. The first outboard shaft 116 may be supported in the fixed pivot portion 90 by first and second bearings 134a, 134b, which also may be opposing tapered roller bearings. The second inboard and outboard shafts 112, 117 may be arranged similarly.

Figure 3:
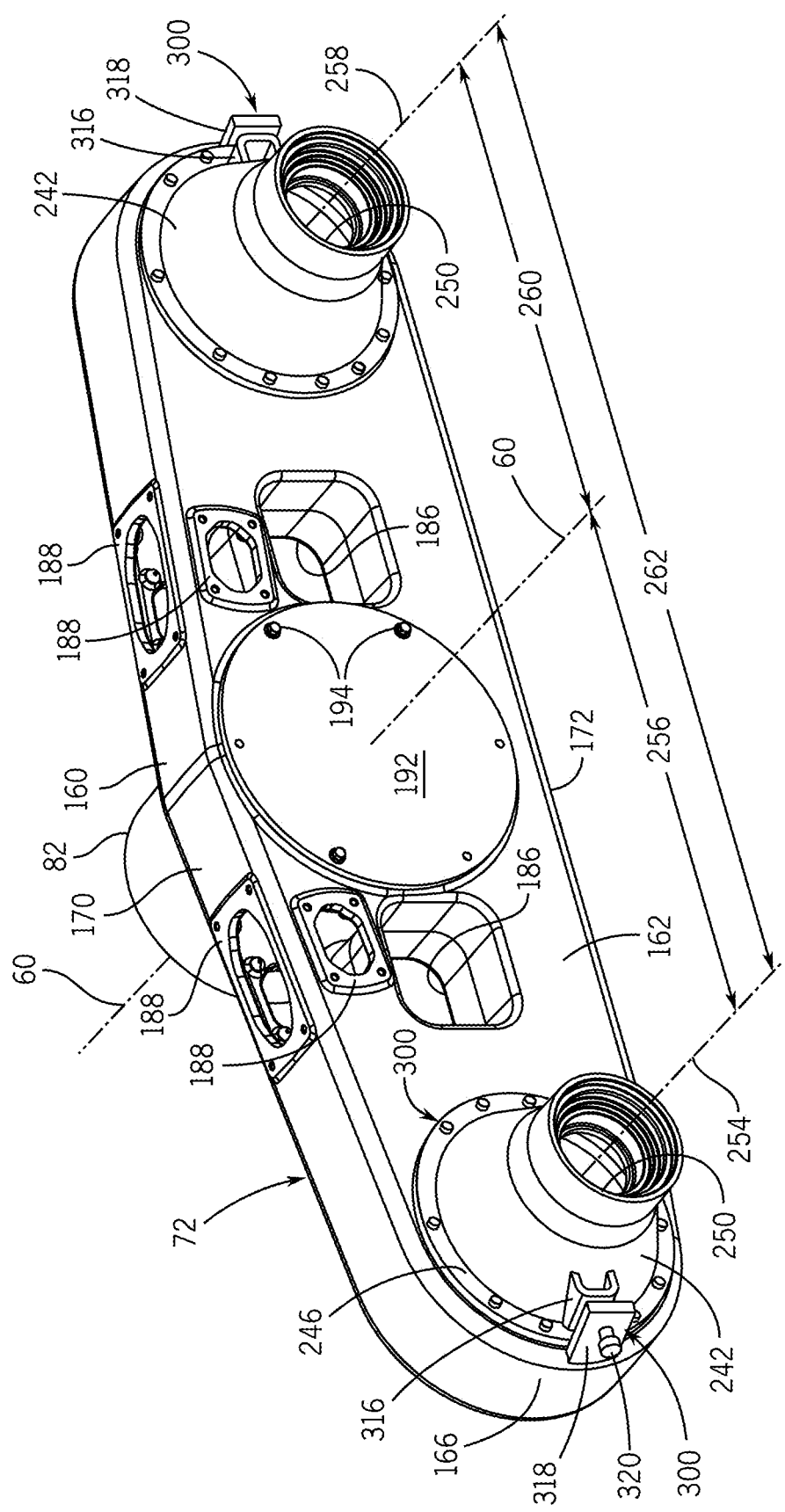
FIG. 3 is an isometric view of an outboard side of an example housing arrangement for the example tandem wheel assembly of FIG. 2.
Figure 4:
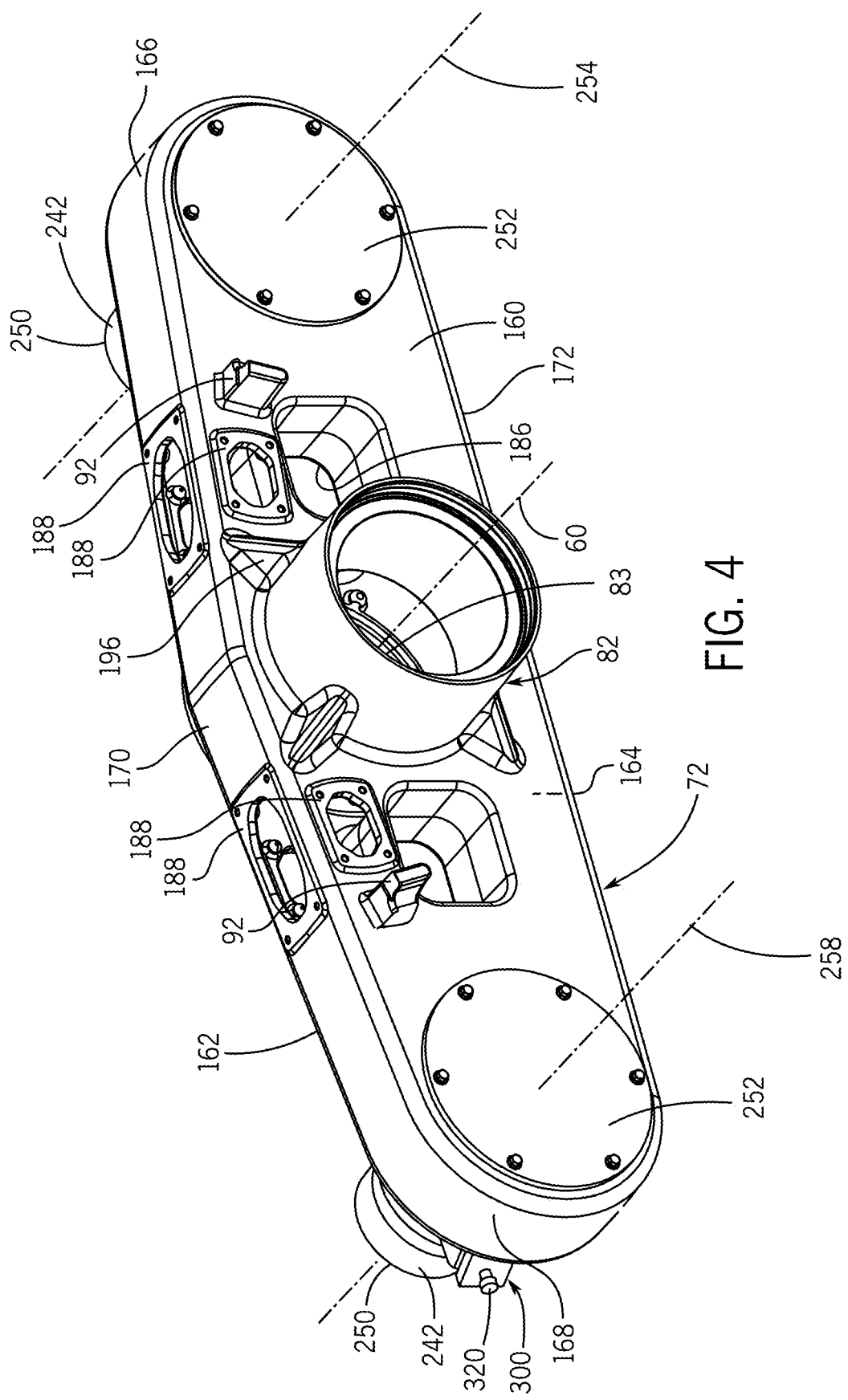
FIG. 4 is an isometric view of an inboard side of thereof.
Figure 5:
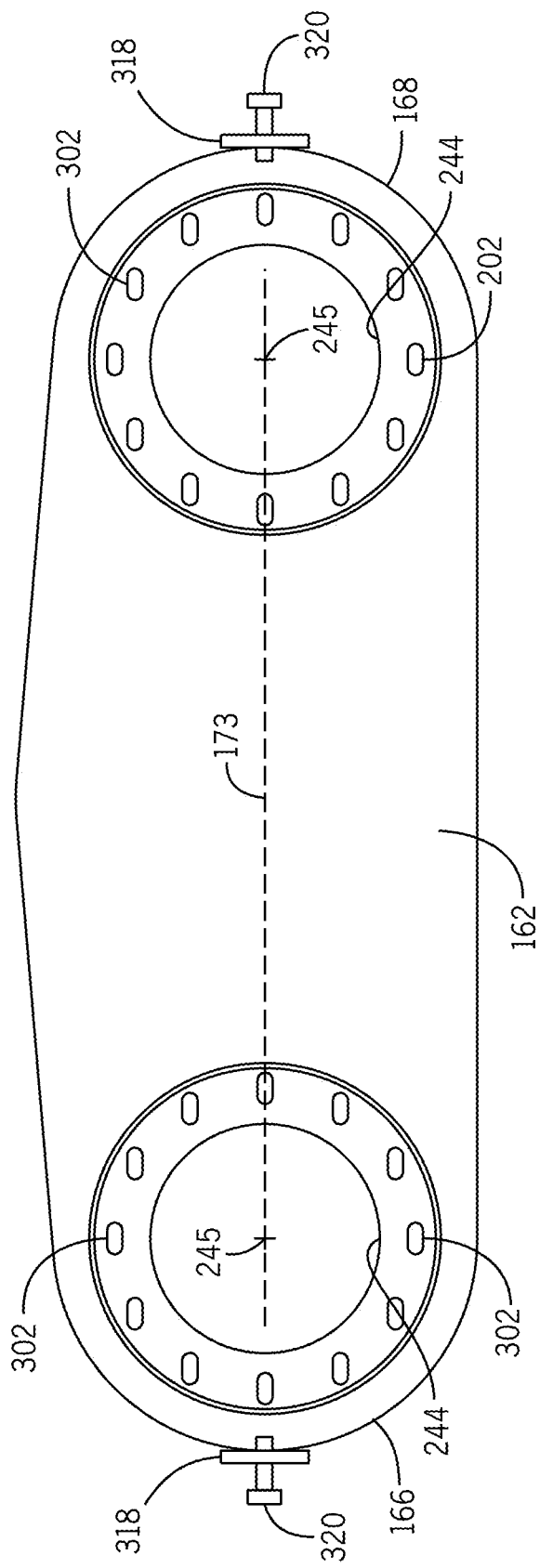
FIG. 5 is a side elevational view of example tandem wheel housing of the tandem wheel assembly.
Figure 6:
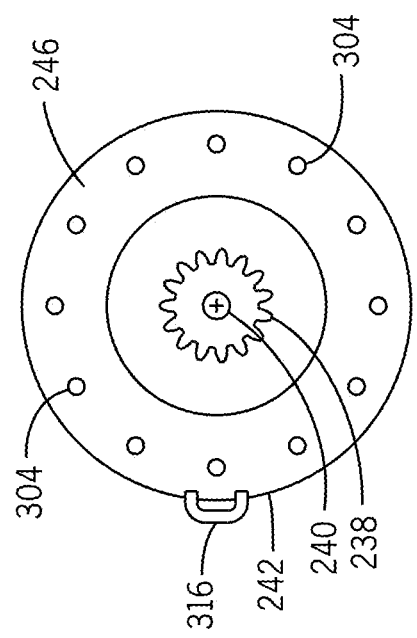
FIG. 6 is a side elevational view of an example wheel end housing the example tandem wheel assembly.

Referring now to FIGS. 3 and 4, each tandem wheel housing 72 may be a generally hollow part that has an inner wall 160 and an outer wall 162 defining an internal volume 164 that extends from a front wall 166 to a rear wall 168 and extends between an upper wall 170 and a lower wall 172. A longitudinal axis 173 of the tandem wheel housing 72 is defined between the front wall 166 and the rear wall 168 and is perpendicular to the pivot axis 60. The tandem wheel housing 72 may be formed of cast metal or other suitable structural material.

Each tandem wheel housing 72 includes a pivot portion 82 extending laterally inwardly toward the differential housing 62 which is rotatably journaled on a fixed pivot portion 90 that is non-rotationally mounted relative to the differential housing 62 (and thus fixed relative to the chassis 12 of the work vehicle 10). The inner wall 160 has the pivot portion 82 as a unitary part of the tandem wheel housing 72 (e.g., integrally formed of the same material by the same process at the same time), although in other examples the pivot portion 82 may be a separate piece. The unitary construction of the pivot portion 82 with the tandem wheel housing 72 may advantageously reduce parts and assembly time, thereby reducing manufacturing costs, and also provides suitable strength and rigidity to accommodate internal and external loads on the tandem wheel housing 72. The pivot portion 82 defines a center opening 83 in the inner wall 160 which is disposed about the pivot axis 60 and communicates with the internal volume 164.

Figure 7:
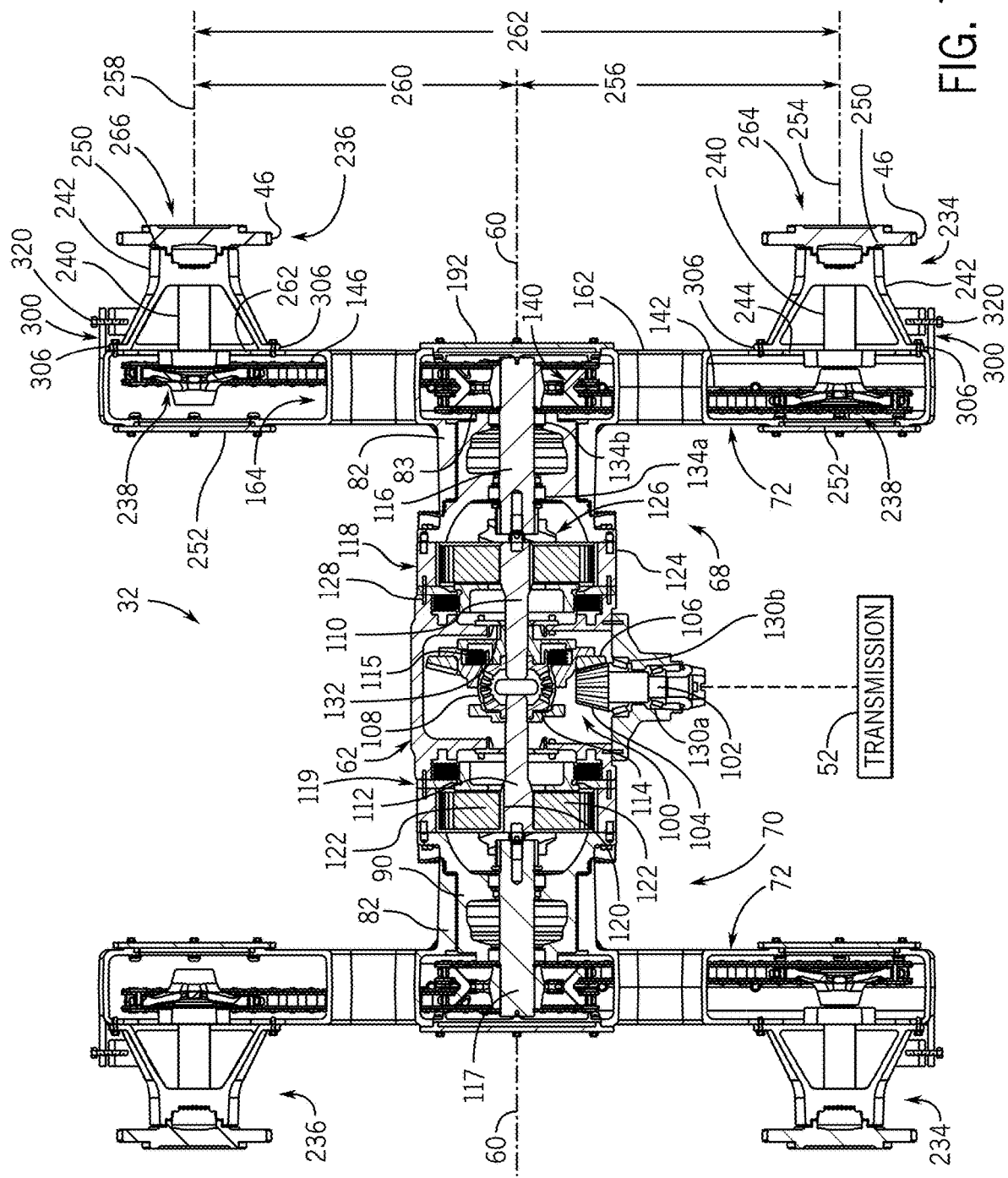
FIG. 7 is a top cross-sectional view of the example tandem wheel assembly taken from plane 7-7 of FIG. 2.
Figure 8:
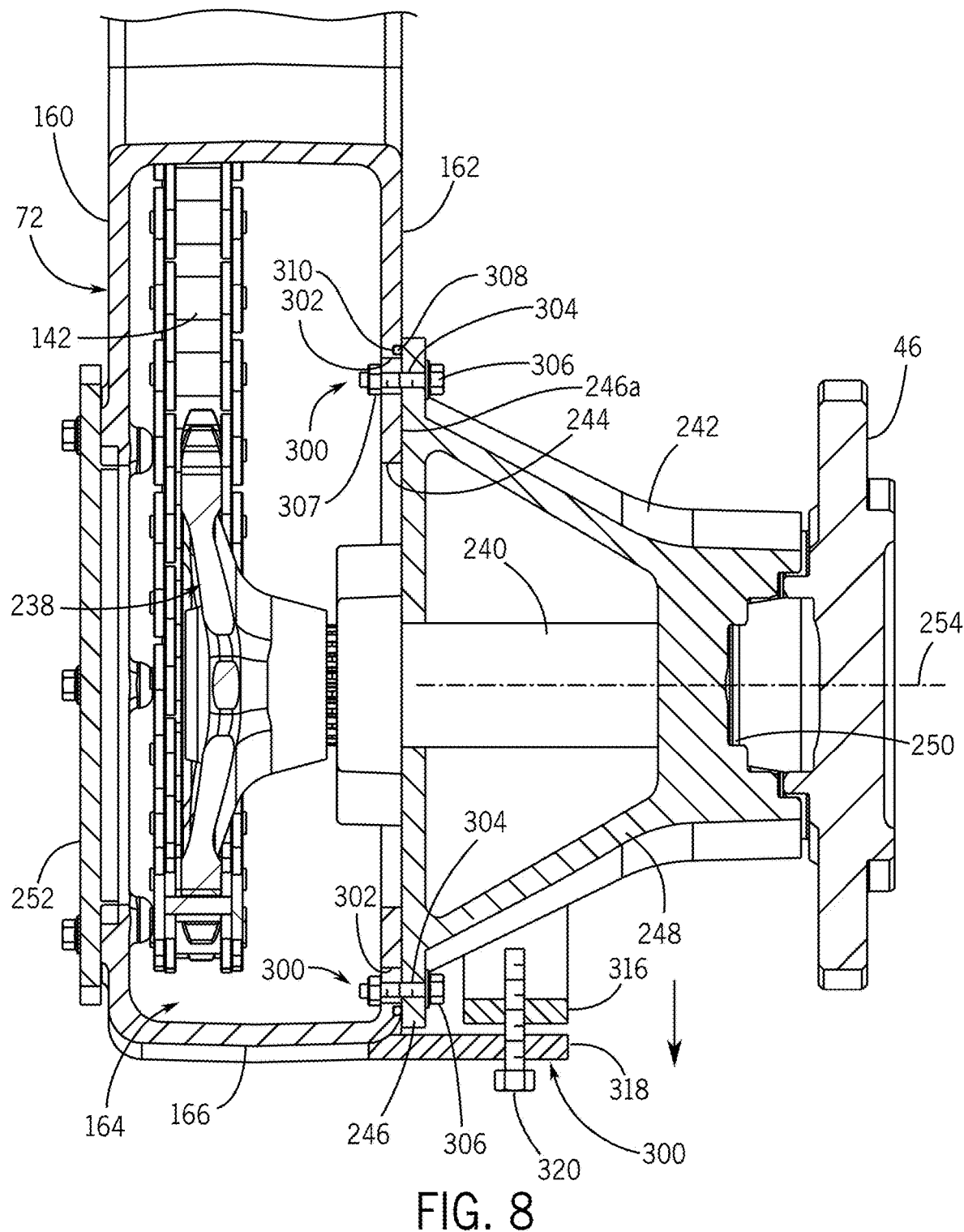
FIG. 8 is an enlarged partial sectional view showing one example wheel end with the tandem wheel housing of FIG. 5 and the wheel end housing of FIG.6.

One or more rotation limiters 92 may be provided on the tandem wheel housings 72 to delimit the maximum pivoting travel of the tandem wheel housings 72 (e.g., by contacting a lower portion of the chassis 12). It will be appreciated that the fixed pivot portion 90 is fixed relative to the work vehicle 10 while supporting the pivot portion 82 for journaled rotation at an exterior of the fixed pivot portion 90 and also supporting the outboard shaft 116 for power transmission rotation. Although not illustrated in detail, the differential housing 62 may house additional components of the differential 100, including brakes, u-joint(s), ring gear, pinion shaft(s), pinion gear(s), planet gear(s), side gears, clutch plates, bearings, and the like. Any type of differential may be implemented within the tandem wheel assembly 32, including an open differential, limited slip differential, or the like. The differential housing 62 also mounts portions of the driveshaft 102 (FIG. 7) and portions of the first and second inboard shafts 110, 112.

The components in each tandem wheel housing 72 may be identical mirror images. Each tandem wheel housing 72 has a center sprocket 140 mounted for co-rotation with the first outboard shaft 116, a first chain 142 connecting the center sprocket 140 to a front or first wheel end assembly 234 on a first side of the center sprocket 140, and a second chain 146 connecting the center sprocket 140 to a rear or second wheel end assembly 236 on a second side of the center sprocket 140. In some embodiments, the center sprocket 140 is a dual-ring sprocket that mounts the first chain 142 extending to the first wheel end assembly 234 and the second chain 146 extending to the second wheel end assembly 236. Each wheel end assembly 234, 236 includes a wheel end sprocket 238, a wheel end shaft 240 which supports the respective wheel 36, 38, 42, 44, and a wheel end housing 242. Each wheel end assembly 234, 236 can be moved in a fore-aft direction relative to the center sprocket 140.

The wheel end sprocket 238 of the wheel end assembly 234 is aligned with one of the dual rings of the center sprocket 140 and connected thereby by the first chain 142. The wheel end sprocket 238 of the wheel end assembly 236 is aligned with the other of the dual rings of the center sprocket 140 and connected thereby by the second chain 146. Although the first chain 142 is illustrated as mounted inboard relative to the second chain 146, these relative positions may be reversed. The wheel end sprockets 238 will have an equal size (e.g., equal number of teeth) to drive the corresponding first and second left wheels 36, 38 at a substantially equal speed. The first and second chains 142, 146 may be leaf chains, roller chains, or other suitable drive chains for heavy construction applications. The chains 142, 146 may be continuous chains without a disassembling or "master" link so as to improve the torque-handling capabilities of the chains 142, 146.

The wheel end shaft 240 is mounted on its wheel end sprocket 238 for co-rotation therewith. Each wheel end shaft 240 extends through an opening 244 in the outer wall 162 and extends laterally outboard from the outer wall 162. Each opening 244 has a diameter which is greater than the diameter of the wheel end shaft 240 and a center 245 is defined at the center point of the opening 244. Each wheel end shaft 240 supports the wheel hub 46 of the respective wheel 36, 38, 42, 44 at the end thereof for co-rotation therewith.

Each wheel end housing 242 extends laterally outboard from the outer wall 162. Each wheel end housing 242 includes a mounting flange 246 having an inboard-facing surface 246a which is parallel to, and seats against the outer wall 162, and a shaft mounting portion 248 extending laterally outwardly from the mounting flange 246. The shaft mounting portion 248 has a wheel end opening 250 at the end thereof that supports at least a portion of the wheel hub 46. The shaft mounting portion 248 may be cone-shaped. The wheel end shaft 240 extends through the wheel end housing 242 and the wheel end opening 250, and the wheel end shaft 240 and the wheel hub 46 are supported in the wheel end housing 242 by rotational bearings (not shown). The wheel end housing 242 may mount various additional supporting components (not shown) such as roller bearings, and as noted above, may mount gear components (not shown, such as a planetary gear set) for providing additional gear reduction between the wheel end sprocket 238 and the wheel hub 46. An access panel 252 may be provided in the inner wall 160 for allowing assembly/repair access to the wheel end sprocket 238 or other components internal to the tandem wheel housing 72.

The wheel end shaft 240 of the first wheel end assembly 234 defines a first wheel end axis 254 that is a rotation axis of the first wheel hub 46 and the wheel 36 (or wheel 42 on the right side of the work vehicle 10), the first wheel end shaft 240 and the first wheel end sprocket 238 when driven by the center sprocket 140 via the first chain 142. This first wheel end axis 254 is substantially parallel to the pivot axis 60. A first distance 256 is defined (FIG. 7) from the first wheel end axis 254 to the pivot axis 60. The wheel end shaft 240 of the second wheel end assembly 236 defines a second wheel end axis 258 that is a rotation axis of the second wheel hub 46 and the wheel 38 (or wheel 44 on the right side of the work vehicle 10), the second wheel end shaft 240 and the second wheel end sprocket 238 when driven by the center sprocket 140 via the second chain 146. This second wheel end axis 258 is substantially parallel to the pivot axis 60. A second distance 260 is defined (FIG. 7) from the second wheel end axis 258 to the pivot axis 60. Accordingly, when the center sprocket 140 rotates, the chains 142, 146 provide co-rotation of the wheel end sprockets 238 of the wheel end assemblies 34, 36, and rotation of the wheels 36, 38, 42, 44.

To propel the work vehicle 10, the engine 50 provides power to the transmission 52 that drives the differential 100, first inboard shaft 110, and first outboard shaft 116 which, in turn, drives the center sprocket 140 in each tandem wheel housing 72. The center sprocket 140 drives the first and second chains 142, 146, which respectively rotate the first and second wheel end sprockets 238 and likewise the first and second wheel end shafts 240 to ultimately turn the pair of right wheels 36, 38 mounted on the wheel end assemblies 234, 236 (or to ultimately turn the pair of left wheels 36, 38 mounted on the wheel end assemblies 234, 236 in the left tandem wheel housing 72). The transmission 52 generally includes one or more gear arrangements and/or clutches (not shown) to modify the speed of the input from the engine 50 into one or more speeds suitable for the tandem wheel assembly 32. Further gear reduction may be achieved via the planetary gear set 118 between the first inboard shaft 110 and the first outboard shaft 116, and via planetary gear set 119 between the second inboard shaft 112 and the second outboard shaft 117. If needed, gear reduction via a planetary gear set (not shown) or the like may be provided between the first wheel end sprocket 238 and the first left wheel 36 and likewise between the second wheel end sprocket 238 and the second left wheel 38.

The first distance 256 and/or the second distance 260 of each tandem wheel assembly 32 can be varied by moving (e.g., translating or sliding) one or both of the wheel end assemblies 234, 236 relative to the outer wall 162 of the tandem wheel housing 72 in the fore-aft direction. The distance between the first distance 256 and the second distance 260 defines the wheelbase 262 of the work vehicle 10. Each tandem wheel housing 72 includes adjustment features 300 to allow for the movement one or both of the wheel end assemblies 234, 236 relative to the outer wall 162 of the tandem wheel housing 72.

In one or more example embodiments, the adjustment features 300 include adjustment openings 302 through the outer wall 162 of each tandem wheel housing 72 radially circumscribing the openings 244, adjustment openings 304 through the mounting flanges 246 of each wheel end housing 242 of each tandem wheel housing 72, and pin fasteners 306 which seat through each set of adjustment openings 302, 304 and fasten securely each wheel end housing 242 to the tandem wheel housing 72 when at the desired distance 256, 260. The pin fasteners 306 may be bolts or other threaded or unthreaded elongated pin-type structures. The adjustment openings 302 through the outer wall 162 around each opening 244 may fall along an imaginary circle. The adjustment openings 302 may be spaced radially outwardly at the same distance from the center 245 of the respective opening 244. The adjustment openings 304 through the mounting flanges 246 may fall along an imaginary circle. The adjustment openings 304 may be spaced radially outwardly at the same distance from the center of the respective wheel end shaft 240. In some embodiments, the openings 302, 304 are provided at the 0-degree position, the 90-degree position, the 180-degree position, and the 270-degree position, and areas between the noted angular positions, around each of the openings 244 and around the mounting flanges 246.

As shown in FIGS. 5-8, the adjustment openings 302 are elongated slots having a long dimension in the fore-aft direction that is substantially parallel to the first and second distances 256, 260, and the adjustment openings 304 are circular apertures, bores or holes. The adjustment openings 304 align or seat over the adjustment openings 302 in each wheel end assembly 234, 236. The wheel end assembly 234 and/or 236 can thus be slid along the outer face of the outer wall 162 toward or away from the pivot axis 60 to position the wheel end assembly 234 and/or 236 at a desired distance from the pivot axis 60 such that the distances 256 and/or 260 can be varied to change the wheelbase 262. The center 245 of the opening 244 and the center of the wheel end shaft 240 may aligned or offset in the fore-aft direction depending on the adjusted position. The openings 302 always remain covered by the respective mounting flange 246. The amount of sliding movement is controlled by the lengths of the slots 302. As a result, the distances 256, 260 can be easily varied to provide different wheelbases 262.

When the wheel end assembly 234 is slid, the wheel end shaft 240 of wheel end assembly 234 slides along the opening 244 in the outer wall 162. The chain 142 becomes tensioned between the sprockets 140, 238. Likewise, when the wheel end assembly 236 is slid, the wheel end shaft 240 of wheel end assembly 236 slides along the opening 244 in the outer wall 162 and the chain 146 becomes tensioned between the sprockets 140, 238. After the wheel end assembly 234 and/or 236 is moved to provide the desired distance 256 and/or 260, the fasteners 306 are inserted through the aligned sets of adjustment openings 302, 304 to affix the wheel end housing 242 in place relative to the tandem wheel housing 72. Since the adjustment openings 302 are slots, this allows for an infinite amount of positions of the wheel end assembly 234 and/or 236 relative to the outer wall 162 along the length of the adjustment openings 302. In order to secure the pins 306 to the outer wall 162, a nut 307 may be attached to the shaft of each fastener 306 within the internal volume 164. To affect this, the access panel 252 can be removed to allow access to the fasteners 306. In some embodiments, tight fit bolt holes or dowel pins with a close clearance can be utilized in some of the openings 302, 304, for example at the 0-degree position and the 180-degree position which fall along the longitudinal axis 173 of the tandem wheel housing 72, to maintain the longitudinal centerline of the tandem wheel housing 72 during the sliding movement.

The adjustment features 300 also include one or more tensioning mechanisms for applying mechanical advantage to move the wheel end assemblies 234, 236 relative to the respective outer wall 162 in the fore-aft direction to vary a relative position of the wheel end assembly 234, 236 along the first and/or second distances 256, 260. In some embodiments, such tensioning mechanisms may be in the form of manual jack-screw tensioners in which a wheel end bracket 316 which extends laterally outward from the mounting flange 246, a housing bracket 318 which extends laterally outward from the outer wall 162 and aligns longitudinally with the wheel end bracket 316, and a jack screw 320 which extends through openings in the brackets 316, 318. The jack screw 320 may be only mounted for rotation on the housing bracket 318. Upon rotation of the jack screw 320, the associated wheel end assembly 234, 236 is moved in the fore-aft direction relative to the outer wall 162 depending upon which way the jack screw 320 is rotated. Alternatively, bolts or other pin structures may be provided that couple the brackets 316, 318 together and permit the fore-aft spacing between the brackets 316, 318 to be adjusted. One or both openings in the brackets 316, 318 may be threaded and the jack screw 320 or bolt may engage the threaded openings such that rotation of the jack screw 320 or bolt in either clock direction causes the brackets 316, 318 to move relatively closer or farther apart. Alternate tensioning mechanisms may be provided with unthreaded openings in the brackets 316, 318 and separate threaded nuts used to threadably engage the bolts. Still in other cases, the brackets 316, 318 may not be needed, and integral features of the tandem wheel housing 72 and the wheel end assemblies 234, 236 may define openings or threaded openings which interface with a pin connector (e.g., a bolt). Other tensioning mechanisms are envisioned, including variation linkages, that may be actuated manually or under power (e.g., electrically or hydraulically motorized) and may be controlled by the control system 28.

Thus, the adjustment features 300 allow for repositioning of each wheel end housing 242 relative to the tandem wheel housing 72 to adjust the fore-aft distance of each wheel end sprocket 238 from the center sprocket 140. The size (i.e., the long dimension of the slots forming the openings 302) primarily defines the extend of that the fore-aft distance may be varied. Depending on the amount of adjustment, one or both of the chains 142, 146 may need to be resized. This may include replacing the chains 142, 146 with shorter or longer chains, such as in the case of continuous chains without a master link, or removing or adding links to the chains in the case of re-sizable chains. Alternatively, or additionally, chain tensioning mechanisms may be included in the tandem wheel assembly that, with a properly sized chain, accommodate for adjustment of the wheel end spacing. In some embodiments the adjusted fore-aft position of the wheel ends may be accommodated by substituting sprockets of different sizes, including replacing the center sprocket and one or both of the wheel end sprockets. And in some cases, both the sprockets and chains may be resized.

In certain embodiments, working elements of the tandem wheel assembly 32 may be partially or entirely engulfed in lubricants, such as lubricating and cooling oil such that a "wet" environment is provided. The inboard-facing surface 246a of the mounting flange 246 occludes the openings 302 to generally block flow through the openings 302. When the fasteners 306 are seated within the adjustment openings 304, a substantially tight fit may provide a liquid-tight seal between the fastener 306 and the mounting flange 246 to substantially prevent the leakage of lubricant therethrough. To further contain lubricant passing between the interface between the tandem wheel housing 72 and the wheel end housings 242, a sliding face seal 308 is provided between the tandem wheel housing 72 and each wheel end housings 242. Each face seal 308 forms a perimeter radially outwardly of the openings 302 and 304 to circumscribe the openings 302, 304 at all times during movement of the wheel end housings 242 relative to the outer wall 162. The sliding face seals 308 may be O-rings or other gaskets. The face seals 308 seat within recesses or grooves 310 in the outer wall 162 and partially extend outwardly from the outer wall 162. When the wheel end housings 242 are seated against the outer wall 162, the face seals 308 are compressed between the outer wall 162 and the wheel end housings 242 to form a fluid-tight, but sliding seal. When the wheel end housings 242 are slid relative to the outer wall 162, the face seals 308 remain seated within the groove 310 and remain in sealed contact with the inboard-facing surface 246a of the respective mounting flange 246. The face seals 308 are provided at a suitable distance outwardly of the openings 302 such that during all possible movement of the wheel end housings 242 relative to the outer wall 162 that the openings 304 on the wheel end housings 242 are also maintained within the perimeters defined by the face seals 308. While the face seals 308 are shown seated within the recesses or grooves 310 in the outer wall 162, it is to be understood that the face seals 308 may be seated within recesses or grooves in the inboard-facing surface 246a of the mounting flange 246, and the face seals 308 move with the respective wheel end housing 242.

Figure 13:
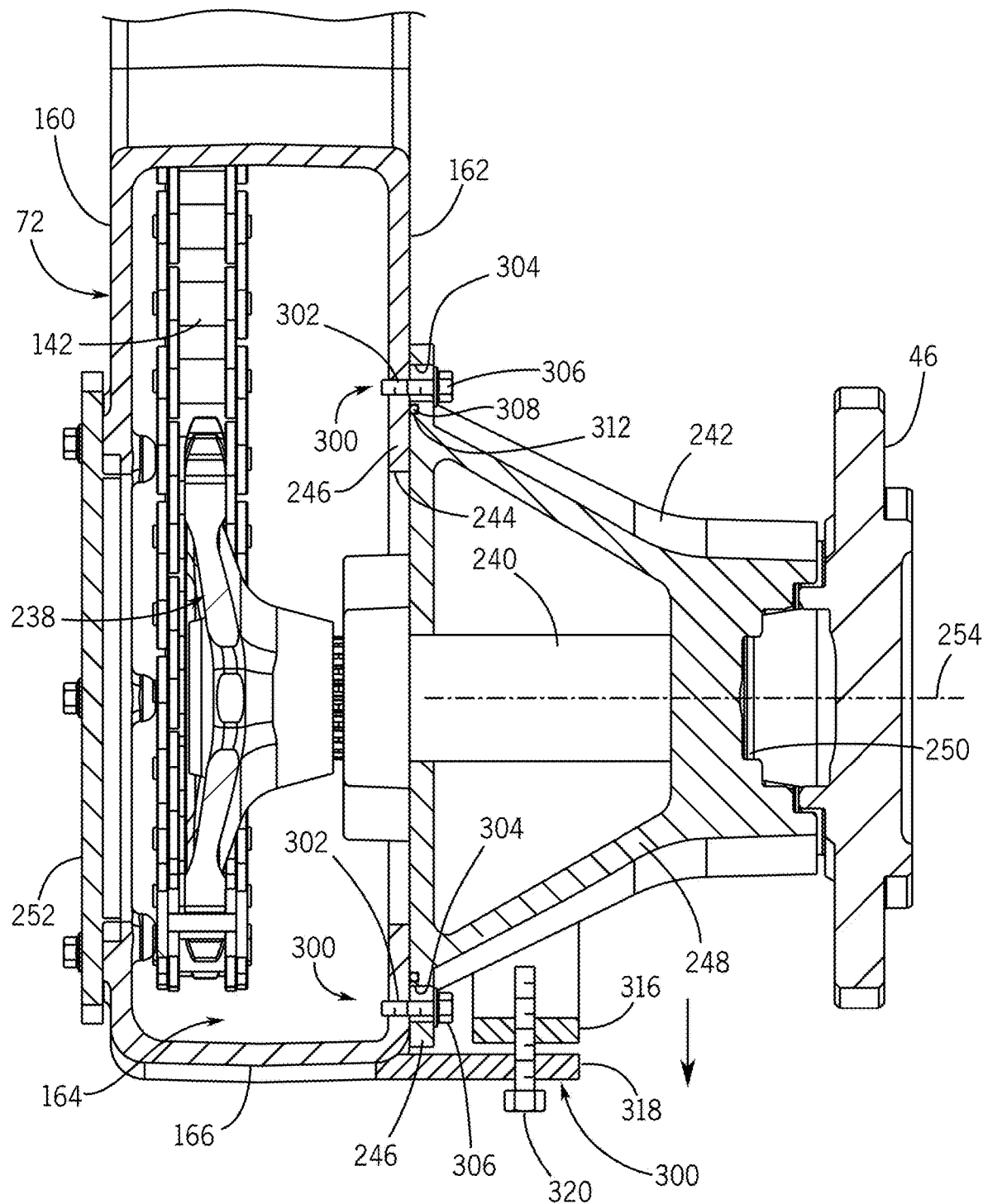
FIG. 13 is an enlarged partial sectional view showing another example wheel end with the tandem wheel housing of FIG. 11 and the wheel end housing of FIG. 12.

In an embodiments, such as shown in FIGS. 11-13, the adjustment openings 302 may be circular apertures, and the adjustment openings 304 may be elongated slots having a long dimension in the fore-aft direction that is substantially parallel to with the first and second distances 256, 260. After the wheel end assembly 234 and/or 236 is moved to provide the desired distance 256 and/or 260, the fasteners 306, inserted through the aligned sets of adjustment openings 302, 304,secure the wheel end housings 242 in place relative to the tandem wheel housing 72. In this example, the openings 302 may be tapped so that their threads may mesh with threads of the fasteners 306 to secure the wheel end housings 242 without other receiving fasteners (e.g., nuts) such that the adjustment may be undertaking without opening the access panels 252. When the tandem wheel assembly 32 is used in the "wet" environment, the meshing threads of the fasteners 306 within the adjustment openings 302 provide a substantially liquid-tight seal provided between the fasteners 306 and the outer wall 162 to substantially prevent the leakage of lubricant therethrough. To further contain lubricant passing between the interface between the tandem wheel housing 72 and the wheel end housings 242, at least one sliding face seal 308 is provided between the tandem wheel housing 72 and each wheel end housing 242. As shown, each face seal 308 forms a perimeter inwardly of the openings 302 and 304 at all times during movement of the wheel end housings 242 relative to the outer wall 162. While the face seals 308 are shown seated within recesses or grooves 312 in the inboard-facing surface 246a of the mounting flange 246, it is to be understood that the face seals 308 may be seated within recesses or grooves in the outer wall 162.

In other embodiments (not shown), the adjustment openings 302 and/or 304 may be a series of discrete circular apertures (not shown) through the outer wall 162 the mounting flange 246 that are spaced apart in the fore-aft direction. To position the wheel end assembly 234 and/or 236 on the outer wall 162 at a desired position, desired ones of the discrete circular apertures are aligned and the fasteners 306 are inserted therethrough after the wheel end assembly 234 and/or 236 is slid to the desired position. Here, the adjustment is set at discrete fore-aft locations, rather can the continuous or infinite adjustment provided between the ends of the openings 302 when defined as elongated slots. When operating in the wet environment, one or more sliding face seals (inwardly and/or outwardly of the adjustment openings) can be provided to substantially deter the leakage of lubricant passing between the interface between the tandem wheel housing 72 and the wheel end housings 242. In other embodiment s(not shown), the adjustment openings 302 and/or 304 may both be a series of discrete spaced apart side-by-side circular apertures provided through the outer wall 162 the mounting flange 246. To position the wheel end assembly 234 and/or 236 on the outer wall 162 at a desired position, desired ones of the discrete circular apertures are aligned and the fasteners 306 are inserted therethrough after the wheel end assembly 234 and/or 236 is slid to the desired position.

In further embodiments (not shown), both of the adjustment openings 302, 304 may be elongated slots. In such embodiments, the adjustment openings 302 each have a long dimension in the fore-aft direction that is substantially parallel to with the first and second distances 256, 260, and the adjustment openings 304 each have a long dimension in the fore-aft direction that is substantially parallel to with the first and second distances 256, 260. Such embodiments may be used in a limited "wet" or "dry" environment applications wherein the internal components are not bathed in lubricant. In such embodiments, after the wheel end assembly 234 and/or 236 is moved to the desired distance 256 and/or 260, the fasteners 306, extending through the aligned sets of adjustment openings 302, 304, secure the wheel end housings 242 in place relative to the tandem wheel housing 72. Since both openings 302, 304 are elongated, the fore-aft adjustment distance may be increased in such embodiments as compared to those with either of the openings 302, 304 being circular (i.e., non-elongated).

The foregoing describes one or more example tandem wheel assemblies in detail. Various other configurations are possible within the scope of this disclosure. For example, the disclosed dual ring two chain drive in the tandem wheel housing may be replaced with a single ring center sprocket and a single chain coupling the center sprocket to both wheel end sprockets.

ENUMERATED EXAMPLES

Also, the following examples are provided, which are numbered for easier reference.

1. A tandem wheel assembly for a work vehicle including: a tandem wheel housing having a center opening disposed about a pivot axis and first and second wheel end openings disposed about associated first and second wheel axes that are substantially parallel with the pivot axis; a center sprocket within the tandem wheel housing and rotatable about the pivot axis; and first and second wheel end assemblies including: first and second wheel end shafts extending through the associated first and second wheel end openings of the tandem wheel housing; first and second wheel end sprockets mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes; and first and second wheel end housings supporting the first and second wheel end shafts for relative rotation about the associated first and second wheel axes; wherein the first wheel end housing is adjustably mounted to the tandem wheel housing to vary a first distance between the pivot axis and the first wheel axis.

2. The tandem wheel assembly of example 1, wherein the second wheel end housing is adjustably mounted to the tandem wheel housing to vary a second distance between the pivot axis and the second wheel axis.

3. The tandem wheel assembly of example 2, wherein at least one of the tandem wheel housing, the first wheel end housing and the second wheel end housing includes one or more adjustment openings configured to vary at least one of the first and second distances.

4. The tandem wheel assembly of example 3, wherein the one or more adjustment openings are slots having a long dimension extending substantially parallel with the first distance.

5. The tandem wheel assembly of example 3, wherein a plurality of the adjustment openings are disposed in an outer wall of the tandem wheel housing proximate the first and second wheel end openings.

6. The tandem wheel assembly of example 3, wherein a plurality of the adjustment openings are disposed in mounting flanges of the first and second wheel end housings.

7. The tandem wheel assembly of example 1, further including an adjustment mechanism mounted between the tandem wheel housing and the first wheel end housing, the adjustment mechanism having a movable member configured to apply a force to move the first wheel end housing with respect to the tandem wheel housing along the first distance.

8. The tandem wheel assembly of example 7, wherein the adjustment mechanism includes: a wheel end bracket fixed to the first wheel end housing and having an opening; a housing bracket fixed to the tandem wheel housing and having an opening; and a pin disposed through the openings of the wheel end bracket and the housing bracket; wherein the adjustment mechanism is configured to vary a relative position of the wheel end bracket and the housing bracket along the first distance.

9. The tandem wheel assembly of example 8, wherein the pin is threaded and at least one of the openings of the wheel end bracket and the housing bracket is threaded, whereby rotation of the pin varies the relative position of the wheel end bracket and the housing bracket.

10. The tandem wheel assembly of example 9, wherein both of the openings of the wheel end bracket and the housing bracket are threaded and the pin threadably engages both of the openings.

11. The tandem wheel assembly of example 2, further including adjustment mechanisms mounted between the tandem wheel housing and each of the first and second wheel end housings, the adjustment mechanisms configured to apply forces to move the first and second wheel end housings with respect to the tandem wheel housing along the associated first and second directions.

12. The tandem wheel assembly of example 1, further including first and second seals about the first and second wheel end openings of the tandem wheel housing between the tandem wheel housing and the associated first and second wheel end housings; wherein the first and second seals are fixed with respect to the tandem wheel housing or the associated first and second wheel end housings; and wherein the first seal effects a sliding face seal during adjustment of the first wheel end housing relative to the tandem wheel housing; wherein at least one of the tandem wheel housing and the first wheel end housing includes one or more adjustment openings configured to vary the first distance; and wherein the first seal is disposed about the one or more adjustment openings.

13. The tandem wheel assembly of example 2, further including first and second seals about the first and second wheel end openings of the tandem wheel housing between the tandem wheel housing and the associated first and second wheel end housings; wherein the first and second seals are fixed with respect to the tandem wheel housing or the associated first and second wheel end housings; and wherein the first and second seals effect sliding face seals during adjustment of the first and second wheel end housings relative to the tandem wheel housing.

14. The tandem wheel assembly of example 13, wherein at least one of the tandem wheel housing, the first wheel end housing and the second wheel end housing includes one or more adjustment openings configured to vary the first and second distances; and wherein the first and second seals are disposed about the associated first and second wheel end openings and associated ones of the one or more adjustment openings.

15. The tandem wheel assembly of example 1, wherein the center sprocket is a dual sprocket with first and second chain rings; and wherein the at least one chain includes first and second chains, the first chain engaging the first chain ring of the center sprocket and the first wheel end sprocket, and the second chain engaging the second chain ring of the center sprocket and the second wheel end sprocket.

Conclusion

The examples discussed above result in a variety of benefits of the disclosed tandem wheel assembly. For example, the coupling of the tandem wheel housing and wheel ends allows for the fore-aft wheelbase of the tandem wheel assembly to be varied. As such, the same tandem wheel housing and wheel ends may be utilized in different work vehicle models with different tandem wheelbases, thereby reducing inventory and manufacturing costs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tandem wheel assembly for a work vehicle comprising:
   a tandem wheel housing having a center opening disposed about a pivot axis and first and second wheel end openings disposed about associated first and second wheel axes that are substantially parallel with the pivot axis;
   a center sprocket within the tandem wheel housing and rotatable about the pivot axis;
   first and second wheel end assemblies including:
      first and second wheel end shafts extending through the associated first and second wheel end openings of the tandem wheel housing;
      first and second wheel end sprockets mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes; and
      first and second wheel end housings supporting the first and second wheel end shafts for relative rotation about the associated first and second wheel axes, the first wheel end housing is adjustably mounted to the tandem wheel housing to vary a first distance between the pivot axis and the first wheel axis; and
   first and second seals about the first and second wheel end openings of the tandem wheel housing between the tandem wheel housing and the associated first and second wheel end housings:
   wherein the first and second seals are fixed with respect to the tandem wheel housing or the associated first and second wheel end housings: and
   wherein the first seal effects a sliding face seal during adjustment of the first wheel end housing relative to the tandem wheel housing.

2. The tandem wheel assembly of claim 1, wherein the second wheel end housing is adjustably mounted to the tandem wheel housing to vary a second distance between the pivot axis and the second wheel axis.

3. The tandem wheel assembly of claim 2, further including adjustment mechanisms mounted between the tandem wheel housing and each of the first and second wheel end housings, the adjustment mechanisms configured to apply forces to move the first and second wheel end housings with respect to the tandem wheel housing along the associated first and second directions.

4. The tandem wheel assembly of claim 2, wherein at least one of the tandem wheel housing, the first wheel end housing and the second wheel end housing includes one or more adjustment openings configured to vary at least one of the first and second distances.

5. The tandem wheel assembly of claim 4, wherein the one or more adjustment openings are slots having a long dimension extending substantially parallel with the first distance.

6. The tandem wheel assembly of claim 4, wherein a plurality of the adjustment openings are disposed in an outer wall of the tandem wheel housing proximate the first and second wheel end openings.

7. The tandem wheel assembly of claim 4, wherein a plurality of the adjustment openings are disposed in mounting flanges of the first and second wheel end housings.

8. The tandem wheel assembly of claim 1, further including an adjustment mechanism mounted between the tandem wheel housing and the first wheel end housing, the adjustment mechanism having a movable member configured to apply a force to move the first wheel end housing with respect to the tandem wheel housing along the first distance.

9. The tandem wheel assembly of claim 8, wherein the adjustment mechanism includes:
   a wheel end bracket fixed to the first wheel end housing and having an opening;
   a housing bracket fixed to the tandem wheel housing and having an opening; and
   a pin disposed through the openings of the wheel end bracket and the housing bracket;
   wherein the adjustment mechanism is configured to vary a relative position of the wheel end bracket and the housing bracket along the first distance.

10. The tandem wheel assembly of claim 9, wherein the pin is threaded and at least one of the openings of the wheel end bracket and the housing bracket is threaded, whereby rotation of the pin varies the relative position of the wheel end bracket and the housing bracket.

11. The tandem wheel assembly of claim 1, wherein at least one of the tandem wheel housing and the first wheel end housing includes one or more adjustment openings configured to vary the first distance; and
   wherein the first seal is disposed about the one or more adjustment openings.

12. The tandem wheel assembly of claim 1, wherein the second seal effects a sliding face seal during adjustment of the second wheel end housing relative to the tandem wheel housing.

13. The tandem wheel assembly of claim 12, wherein at least one of the tandem wheel housing, the first wheel end housing and the second wheel end housing includes one or more adjustment openings configured to vary the first and second distances; and wherein the first and second seals are disposed about the associated first and second wheel end openings and associated ones of the one or more adjustment openings.

14. The tandem wheel assembly of claim 1, wherein the center sprocket is a dual sprocket with first and second chain rings; and wherein the at least one chain includes first and second chains, the first chain engaging the first chain ring of the center sprocket and the first wheel end sprocket, and the second chain engaging the second chain ring of the center sprocket and the second wheel end sprocket.

15. A tandem wheel assembly for a work vehicle comprising:

a tandem wheel housing having a center opening disposed about a pivot axis and first and second wheel end openings disposed about associated first and second wheel axes that are substantially parallel with the pivot axis;

a center sprocket within the tandem wheel housing and rotatable about the pivot axis;

first and second wheel end assemblies including:
first and second wheel end shafts extending through the associated first and second wheel end openings of the tandem wheel housing;
first and second wheel end sprockets mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes; and
first and second wheel end housings supporting the first and second wheel end shafts for relative rotation about the associated first and second wheel axes, wherein the first wheel end housing is adjustably mounted to the tandem wheel housing to vary a first distance between the pivot axis and the first wheel axis; and an adjustment mechanism mounted between the tandem wheel housing and the first wheel end housing, the adjustment mechanism having a movable member configured to apply a force to move the first wheel end housing with respect to the tandem wheel housing along the first distance, wherein the adjustment mechanism includes:
a wheel end bracket fixed to the first wheel end housing and having an opening;
a housing bracket fixed to the tandem wheel housing and having an opening; and
a pin disposed through the openings of the wheel end bracket and the housing bracket;
wherein the adjustment mechanism is configured to vary a relative position of the wheel end bracket and the housing bracket along the first distance;
wherein the pin is threaded and at least one of the openings of the wheel end bracket and the housing bracket is threaded, whereby rotation of the pin varies the relative position of the wheel end bracket and the housing bracket; and wherein both of the openings of the wheel end bracket and the housing bracket are threaded and the pin threadably engages both of the openings.

16. A tandem wheel assembly for a work vehicle comprising:

a tandem wheel housing having a center opening disposed about a pivot axis and first and second wheel end openings disposed about associated first and second wheel axes that are substantially parallel with the pivot axis;

a center sprocket within the tandem wheel housing and rotatable about the pivot axis;

first and second wheel end assemblies including:
first and second wheel end shafts extending through the associated first and second wheel end openings of the tandem wheel housing;
first and second wheel end sprockets mounted to the associated first and second wheel end shafts and aligned within the tandem wheel housing to engage the center sprocket with at least one chain which transfers rotation of the center sprocket about the pivot axis to rotate the first and second wheel end sprockets about the associated first and second wheel axes; and
first and second wheel end housings supporting the first and second wheel end shafts for relative rotation about the associated first and second wheel axes one or more of the first and second wheel end housings is adjustably mounted to the tandem wheel housing to vary one or more of first and second distances between the pivot axis and the associated first and second wheel axes; and first and second seals about the first and second wheel end openings of the tandem wheel housing between the tandem wheel housing and the associated first and second wheel end housings, the first and second seals are fixed with respect to the tandem wheel housing or the associated first and second wheel end housings and the first seal effects a sliding face seal during adjustment of the first and second wheel end housings relative to the tandem wheel housing.

17. The tandem wheel assembly of claim 16, wherein one or more of the tandem wheel housing, the first wheel end housing and the second wheel end housing includes one or more adjustment openings configured to vary one or more of the first and second distances;

wherein the one or more adjustment openings are a plurality of slots having a long dimension extending substantially parallel with the first and second distances; and wherein the plurality of slots are disposed in an outer wall of the tandem wheel housing proximate the first and second wheel end openings or in mounting flanges of the first and second wheel end housings.

18. The tandem wheel assembly of claim 16, further including adjustment mechanisms mounted between the tandem wheel housing and each of the first and second wheel end housings, the adjustment mechanisms configured to apply forces to move the first and second wheel end housings with respect to the tandem wheel housing along the associated first and second directions.

* * * * *

UNITED STATES PATENT AND TRADEMARK OFFICE
CERTIFICATE OF CORRECTION

PATENT NO. : 11,760,196 B2
APPLICATION NO. : 17/186516
DATED : September 19, 2023
INVENTOR(S) : Fliearman et al.

Page 1 of 1

It is certified that error appears in the above-identified patent and that said Letters Patent is hereby corrected as shown below:

In the Claims

In Column 17, Line 64, Claim 1, delete "housings:" and insert -- housings; --, therefor.

In Column 17, Line 67, Claim 1, delete "housings:" and insert -- housings; --, therefor.

In Column 19, Line 22, Claim 15, delete "axis:" and insert -- axis; --, therefor.

Signed and Sealed this
Fifth Day of December, 2023

Katherine Kelly Vidal
*Director of the United States Patent and Trademark Office*